(12) United States Patent
McCorkendale et al.

(10) Patent No.: US 7,640,590 B1
(45) Date of Patent: Dec. 29, 2009

(54) PRESENTATION OF NETWORK SOURCE AND EXECUTABLE CHARACTERISTICS

(75) Inventors: Bruce McCorkendale, Manhattan Beach, CA (US); William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 770 days.

(21) Appl. No.: 11/020,514

(22) Filed: Dec. 21, 2004

(51) Int. Cl.
G08B 23/00 (2006.01)
G06F 11/30 (2006.01)

(52) U.S. Cl. .......................... 726/25; 713/188; 726/23; 726/24

(58) Field of Classification Search ............. 726/22–25; 713/188
See application file for complete search history.

(56) References Cited

U.S. PATENT DOCUMENTS

| | | | |
|---|---|---|---|
| 5,392,207 A * | 2/1995 | Wilson et al. ................. | 700/64 |
| 5,675,710 A | 10/1997 | Lewis | |
| 5,757,916 A | 5/1998 | MacDoran et al. | |
| 5,778,304 A | 7/1998 | Grube et al. | |
| 5,826,249 A | 10/1998 | Skeirik | |
| 5,887,269 A | 3/1999 | Brunts et al. | |
| 5,930,474 A * | 7/1999 | Dunworth et al. ........... | 709/217 |
| 5,982,897 A | 11/1999 | Clark | |
| 6,023,723 A | 2/2000 | McCormick et al. | |
| 6,052,709 A | 4/2000 | Paul | |
| 6,072,942 A | 6/2000 | Stockwell et al. | |
| 6,088,803 A | 7/2000 | Tso et al. | |
| 6,154,172 A | 11/2000 | Piccionelli et al. | |
| 6,161,130 A | 12/2000 | Horvitz et al. | |
| 6,167,434 A | 12/2000 | Pang | |
| 6,182,223 B1 * | 1/2001 | Rawson ........................ | 726/22 |
| 6,202,158 B1 * | 3/2001 | Urano et al. ................... | 726/22 |
| 6,249,807 B1 | 6/2001 | Shaw et al. | |
| 6,253,169 B1 | 6/2001 | Apte et al. | |
| 6,282,565 B1 | 8/2001 | Shaw et al. | |
| 6,282,660 B1 * | 8/2001 | Anne et al. .................. | 713/300 |
| 6,289,416 B1 | 9/2001 | Fukushima et al. | |
| 6,298,351 B1 | 10/2001 | Castelli et al. | |
| 6,314,409 B2 | 11/2001 | Schneck | |
| 6,324,569 B1 | 11/2001 | Ogilvie et al. | |
| 6,347,310 B1 | 2/2002 | Passera | |
| 6,370,526 B1 | 4/2002 | Agrawal et al. | |
| 6,370,629 B1 | 4/2002 | Hastings et al. | |
| 6,397,200 B1 | 5/2002 | Lynch, Jr. et al. | |
| 6,397,215 B1 | 5/2002 | Kreulen et al. | |
| 6,421,709 B1 | 7/2002 | McCormick et al. | |

(Continued)

OTHER PUBLICATIONS

AirCERT web page, last updated Sep. 18, 2000 [online]. Cert.org [retrieved Apr. 18, 2003]. Retrieved from the Internet:URL:http://www.cert.org/kb/aircert/, U.S.A.

(Continued)

*Primary Examiner*—Eleni A Shiferaw
(74) *Attorney, Agent, or Firm*—Fenwick & West LLP

(57) ABSTRACT

A risk assessment module identifies information regarding a source. The risk assessment module submits the identified information regarding the source to a server. A compilation module of the server accesses one or more services to determine one or more characteristics of the source. The compilation module provides the determined one or more characteristics of the source to the client. A presentation module of the client presents the one or more characteristics of the source to a user.

28 Claims, 6 Drawing Sheets

U.S. PATENT DOCUMENTS

| | | |
|---|---|---|
| 6,424,960 B1 | 7/2002 | Lee et al. |
| 6,442,606 B1 | 8/2002 | Subbaroyan et al. |
| 6,453,419 B1 | 9/2002 | Flint et al. |
| 6,456,991 B1 | 9/2002 | Srinivasa et al. |
| 6,480,885 B1 | 11/2002 | Olivier |
| 6,487,586 B2 | 11/2002 | Ogilvie et al. |
| 6,493,007 B1 | 12/2002 | Pang |
| 6,493,752 B1 * | 12/2002 | Lee et al. .................... 709/223 |
| 6,502,082 B1 | 12/2002 | Toyama et al. |
| 6,505,167 B1 | 1/2003 | Horvitz et al. |
| 6,546,416 B1 | 4/2003 | Kirsch |
| 6,640,301 B1 | 10/2003 | Ng |
| 6,643,685 B1 | 11/2003 | Millard |
| 6,650,890 B1 | 11/2003 | Irlam et al. |
| 6,654,787 B1 | 11/2003 | Aronson et al. |
| 6,687,740 B1 | 2/2004 | Gough |
| 6,691,156 B1 | 2/2004 | Drummond et al. |
| 6,697,942 B1 | 2/2004 | L'Heureux |
| 6,701,347 B1 | 3/2004 | Ogilvie |
| 6,711,608 B1 | 3/2004 | Ogilvie |
| 6,732,157 B1 | 5/2004 | Gordon et al. |
| 6,757,713 B1 | 6/2004 | Ogilvie et al. |
| 6,757,830 B1 | 6/2004 | Tarbotton et al. |
| 6,859,791 B1 | 2/2005 | Spagna et al. |
| 6,901,346 B2 * | 5/2005 | Tracy et al. ................. 702/181 |
| 6,928,553 B2 | 8/2005 | Xiong et al. |
| 7,096,368 B2 * | 8/2006 | Kouznetsov et al. ........ 713/189 |
| 7,155,484 B2 | 12/2006 | Malik |
| 2002/0016831 A1 | 2/2002 | Peled et al. |
| 2002/0038308 A1 | 3/2002 | Cappi |
| 2002/0042687 A1 | 4/2002 | Tracy et al. |
| 2002/0083343 A1 | 6/2002 | Crosbie |
| 2002/0087641 A1 | 7/2002 | Levosky |
| 2002/0087649 A1 | 7/2002 | Horvitz |
| 2002/0087882 A1 | 7/2002 | Schneier et al. |
| 2002/0133523 A1 * | 9/2002 | Ambler et al. .............. 707/536 |
| 2002/0138525 A1 | 9/2002 | Karadimitriou et al. |
| 2002/0138581 A1 | 9/2002 | MacIntosh et al. |
| 2002/0147694 A1 | 10/2002 | Dempsey et al. |
| 2002/0147782 A1 | 10/2002 | Dimitrova et al. |
| 2002/0156902 A1 * | 10/2002 | Crandall .................... 709/228 |
| 2002/0157020 A1 | 10/2002 | Royer |
| 2002/0165912 A1 | 11/2002 | Wenocur et al. |
| 2002/0199095 A1 | 12/2002 | Bandini et al. |
| 2002/0199186 A1 | 12/2002 | Ali et al. |
| 2002/0199194 A1 | 12/2002 | Ali |
| 2003/0033587 A1 | 2/2003 | Ferguson et al. |
| 2003/0037251 A1 | 2/2003 | Frieder |
| 2003/0051026 A1 | 3/2003 | Carter |
| 2003/0105864 A1 | 6/2003 | Mulligan et al. |
| 2003/0149726 A1 | 8/2003 | Spear |
| 2003/0167311 A1 | 9/2003 | Kirsch |
| 2003/0191969 A1 | 10/2003 | Katsikas |
| 2003/0200334 A1 * | 10/2003 | Grynberg .................... 709/245 |
| 2003/0220978 A1 | 11/2003 | Rhodes |
| 2003/0229672 A1 | 12/2003 | Kohn |
| 2003/0229801 A1 | 12/2003 | Kouznetsov et al. |
| 2003/0233415 A1 | 12/2003 | Beyda |
| 2004/0003283 A1 | 1/2004 | Goodman et al. |
| 2004/0024823 A1 | 2/2004 | Del Monte |
| 2004/0054887 A1 | 3/2004 | Paulsen et al. |
| 2004/0064734 A1 | 4/2004 | Ehrlich |
| 2004/0068534 A1 | 4/2004 | Angermayr et al. |
| 2004/0073617 A1 | 4/2004 | Milliken |
| 2004/0093383 A1 | 5/2004 | Huang et al. |
| 2004/0093384 A1 * | 5/2004 | Shipp ......................... 709/206 |
| 2004/0111480 A1 | 6/2004 | Yue |
| 2004/0148358 A1 | 7/2004 | Singh et al. |
| 2004/0177271 A1 * | 9/2004 | Arnold et al. ............... 713/201 |
| 2004/0205173 A1 | 10/2004 | Hall |
| 2005/0015455 A1 * | 1/2005 | Liu ............................. 709/207 |
| 2005/0097179 A1 | 5/2005 | Orme |
| 2005/0144480 A1 * | 6/2005 | Kim et al. .................... 713/201 |

OTHER PUBLICATIONS

Analysis Console for Intrusion Detection (ACID) web page [online]. Andrew.cmu.edu [retrieved Apr. 18, 2003]. Retrieved from the InternetURL:http://www.andrew.cmu.edu/~rdanyliw/snort/snortacid.html, U.S.A.

Basis Technology's Rosette Language Identifier, 2 pages, downloaded from http://www.basistech.com/language-identification/ on Aug. 25, 2005, U.S.A.

"Caltarian Security Technology Platform," Riptech web pages [online]. Symantec.com [retrieved Apr. 18, 2003]. Retrieved from the Internet: URL:http://enterprisesecurity.symantec.com/Content/displayPDF.cfm?SSSPDFID=35&EID=O, U.S.A. cauce.org web pages [online]. Coalition Against Unsolicited Commercial Email [retrieved Mar. 17, 2003]. Retrieved from the Internet: <URL: http://www.cauce.org/about/problem.shtml>.

Cavnar, William B. et al., "N-Gram Based Text Categorization," Proceedings of the SDAIR-94, $3^{rd}$ Annual Symposium on Document Analysis and Information Retrieval, Las Vegas, NV, USA, Apr. 13, 1994.

Change log for Analysis Console for Intrusion Detection (Acid), indicating release date of Sep. 8, 2000 [online]. Andrew.cmu.edu [retrieved Apr. 18, 2003]. Retrieved from the Internet:URL:http://www.andrew.cmu.edu/~rdanyliw/snort/CHANGELOG, U.S.A.

Chung, C., Gertz, M. and Levitt, K., "DEMIDS: a Misuse Detection System for Database Systems," Department of Computer Science, University of California at Davis, Oct. 1, 1999, pp. 1-18.

Cranor, Faith L., LaMacchia Brian A., "Spam!" Communications of the ACM, vol. 41, No. 8, pp. 74-83, Aug. 1998, U.S.A.

CyberGuard Corporation, "*CyberGuard and Webwasher: The Value Proposition*," A CyberGuard Corporation White Paper, May 2004, 6 pages.

e=Security, Inc., Correlation Technology for Security Event Management, Oct. 7, 2002 [online]. eSecurityins.com [retrieved Apr. 18, 2003]. Retrieved from the Internet:URL:http://www.esecurityinc.com/downloads/Correlation_WP.pdf, Vienna, VA.

How it Works: Spam Recognition, http://www.death2spam.net/docs/classifier.html, retrieved Aug. 18, 2005, U.S.A.

Karp-Rabin algorithm, 3 pages, downloaded from http://www-igm.univ-mlv.fr/~lecroq/string/node5.html on Sep. 1, 2005, U.S.A.

Kularski, C., "Compound Procedures for Spam Control," Highland School of Technology, Jan. 2004.

Lee, Sin Yeung; Low, Wai Lup and Wong, Pei Yuen, "Learning Fingerprints for a Database Intrusion Detections System," Computer Security Laboratory, DSO National Laboratories, Singapore, ESORICS Nov. 2002, LNCS 2502, pp. 264-279.

Low, Wai Lup, et al., "DIDAFIT: Detecting Intrusions in Databases Through Fingerprinting Transactions," ICEIS 2002, Fourth International Conference on Enterprise Information Systems, vol. 1, Apr. 3-6, 2002, pp. 121-128, Ciudad Real, Spain.

Marketing, "*Digital Certificates—Best Practices—A Microdasys Whitepaper*," bestptractice.doc, Revision 1/1 (Jul. 31, 2003), 6 pages, Czech Republic.

Microdasys, "*SCIP Secured Content Inspection: Protecting the Enterprise from CryptoHacks*," 2003 by Microdasys Inc., 2 pages, Czech Republic.

MyNEtWatchman.com web pages indicating 9/00 beta release [online]. MyNetWatchman.com [retrieved Apr. 18, 2003]. Retrieved from the Internet: URL:http://www.mynetwatchman.com/mynetwatchman/relnotes.htm, Alpharetta, GA.

NBEC/NWOCA Anti-Spam Tools, [online] [retrieved Jul. 7, 2004] retrieved from http://home.nwoca.org, Jul. 7, 2004.

Network Computing Solutions—"*Microdasys SCIP*" [online]. Retrieved on Mar. 18, 2005. Retrieved from the Internet:URL:http://www.ncs.cz/index.php?language=en&menuitem-4&subitem=13, 2 pages, Czech Republic.

Network Computing Solutions—NSC Homepage—*News* [online]. Retrieved on Mar. 18, 2005. Retrieved from the Internet:URL:http://www.nsc.cz/index.php?language=en&menuitem=0&subitem=4&subitem=13, 3 pages, Czech Republic.

"N-Gram Based Text Categorization," 2 pages, downloaded from http://citeseer.ist/psu.edu/68861.htm, Aug. 25, 2005 U.S.A.

Outlook.spambully.com web pages [online] Spam Bully [retrieved Jan. 16, 2003] Copyright 2002, Retrieved from the Internet<URL:http://outlook.spambully.com/about.php>.

The Rabin-Karp algorithm, String searching via Hashing, 5 pages, downloaded from http://www.eecs.harvard.edu/—ellard/Q-07/HTML/root/node43 on Aug. 31, 2005 U.S.A.

Rabin-Karp string search algorithm, 5 pages, downloaded from http://en.wikipedia.org/wiki/Rabin-Karp_string_search_algorithm on Aug. 31, 2005 U.S.A.

Schneier, Bruce, Managed Security Monitoring: Network Security for the 21st Century, 2001 [online]. Counterpane.com [retrieved Apr. 18, 2003]. Retrieved from the Internet:URL:http://www.counterpane.com/msn.pdf, U.S.A.

SCIP Product, Microdasys—"*The need to control, inspect and manage encrypted webtraffic.*" [online]. Retrieved on Mar. 18, 2005. Retrieved from the Internet:URL:http://www.microdasys.com/scipproduct+M54a708de802.html. Author unknown, 2 pages, Czech Republic.

Slashdot.org web pages describing Dshield, dated Nov. 27, 2000 [online]. Slashdot.org [retrieved Apr. 18, 2003]. Retrieved from the Internet: URL:http://slashdotorg/article.pl?sid=00/11/27/1957238&mode=thread, U.S.A.

Spam Assissin, The Apache SpamAssasin Projectm, 2 pages, downloaded from http://spamassassin.apache.org on Aug. 25, 2005, U.S.A.

"*SSL Stripper Installation Guide,*" [online]. Retrieved in Mar. 2005 from the Internet:URL:http://www.sslstripper.com, 2 pages, U.S.A.

SSL Stripper Home Page, "*Security Solutions: SSL Stripper,*" [online]. Retrieved on Mar. 18, 2005. Retrieved from the Internet:URL:http://www.vroyer.org/sslstripper/screenshots.html, 3 pages, Oct. 15, 2004, U.S.A.

SSL Stripper Sample Screenshots, "*Security Solutions: Sample Screenshots,*" [online]. Retrieved on Mar. 18, 2005. Retrieved from the Internet:URL:http://www.vroyer.org/sslstripper/screenshots.html, 3 pages, Oct. 15, 2004, U.S.A.

"Technical Responses to Spam," Nov. 2003, Taughannock Networks.

TextCat Language Guesser, 2 pages, downloaded from http://odur.let.rug.n1/~vannord/Textcat/ on Aug. 25, 2005, U.S.A.

Web page, announcing Nov. 11, 2000 release of Dshield [online]. Deja.com [retrieved Apr. 18, 2003]. Retrieved from the Internet:URL:http://groups.google.com/groups?selm=8vm48v%245pd%241%40nnrp1.deja.com&oe=UTF8&output=gplain, U.S.A.

Webasher AG/Full feature set, "*Full feature set,*" [online]. Retrieved on Mar. 18, 2005. Retrieved from the Internet:URL:http://www.webwasher.com/enterprise/products/webwasher_products/ssl_scanner/full_feature_set.html?1 . . . , 2 pages.

Webwasher AG/Webwasher 1000 CSM Appliance, "*Webwasher 1000 CSM Appliance,*" [online]. Retrieved on Mar. 18, 2005. Retrieved from the Internet:URL:http://www.webwasher.com/enterprise/products/webwasher_products/scm_applicance/index . . . 2 pages.

Webwasher AG/Webwasher URL Filter, "*Webwashter URL Filter,*" [online]. Retrieved on Mar. 18, 2005. Retrieved from the Internet: URL:http://www.webwasher.com/enterprise/products/webwasher_products/webwasther_url_filter.. 1 page.

Webwasher AG/Webwasher Anti Virus, "*Webwasher Anti Virus,*" [online]. Retrieved on Mar. 18, 2005. Retrieved from tdhe Internet:URL:http:/www.webwashter.com/enterprise/products/webwasher_products/anti_virus/index.html. . . , 2 pages.

Webwasher AG/Webwasher Anti Spam, "*Webwasher Anti Spam,*" [online]. Retrieved on Mar. 18, 2005. Retrieved from the InternetURL:http://www.webwashter.com/enterprise/products/webwasher_products/anti_spam/index.htm . . . , 1 page.

Webwasher AG/Webwasher Content Protection, "*Webwasher Content Protection,*" [online]. Retrieved on Mar. 18, 2005. Retrieved from the Internet: URL:http://www.webwasher.com/enterprise/products/webwasher_products/content_protection/index.html, 2 pages.

Webwasher AG/Webwasher SSL Scanner, "*Webwasher SSL Scanner,*" [online]. Retrieved on Mar. 18, 2005. Retrieved from the Internet:URL:http://www.webwasher.com/enterprise/products/webwasher_products/ssl_scanner/index.html, 2 pages.

Wikipedia.org web pages (online). Wikipedia (retrieved Mar. 17, 2003). Retrieved from the Internet: <URL: http://www.wikipedia.org/w/wiki.phtml?title= Machine learning & printable=yes>.

2000 Review of eSecurity product on Network Security web page [online]. SCMagazine.com [retrieved Apr. 18, 2003]. Retrieved from the Internet: <URL:http://www.scmagazine.com/scmagazine/2000_12/testc/network.htm#Open>.

* cited by examiner

US 7,640,590 B1

PRESENTATION OF NETWORK SOURCE AND EXECUTABLE CHARACTERISTICS

BACKGROUND OF THE INVENTION

1. Field of the Invention

This invention pertains in general to computer security and in particular to techniques for allowing a user to make an informed decision with regard to a potential security threat.

2. Background Art

Computer users are under constant threats from various computer and network sources. For example, a user may receive a communication such as an electronic mail (email) that includes a link to a particular web site. The user clicks on the link and accesses the web site. The web site claims to be a legitimate entity and requests important information (e.g., credit card, social security, or bank account number) from the user. The web site, however, is bogus and is setup to misappropriate the user's information. Such a fraudulent communication is often referred to as a phishing scam.

In another example, a user may receive executable code from a network source. Unbeknownst to the user, the executable code is a malicious program such as a spyware, adware, Trojan horse, virus, worm, or keyboard-logging program. Such executable code can breach the user's computer security.

Users also face other possible threats, including fraudulent domain names pretending to be legitimate entities, web sites that sell deceptive products or services, and network sources that generate spam. These threats prevent users from safely engaging in a computing environment.

One technique for mitigating the threats is to install an antivirus, personal firewall, or other traditional security software on the computer system to detect the presence of worms, viruses, and other malicious programs. However, such existing techniques may fail to accurately identify deceptive attempts to defraud the user and may be prone to false positives. Moreover, this technique fails to provide a way for the user to make an informed decision as to whether a potential threat is indeed a threat to the user.

Therefore, there is a need in the art for a technique that allows a user to make an informed decision regarding a potential threat from a source.

DISCLOSURE OF INVENTION

The above need is met by a risk assessment module that identifies information regarding a source. The risk assessment module submits the identified information regarding the source to a server, which can be run on the same machine as a client running the risk assessment module. A compilation module of the server accesses one or more services to determine one or more characteristics of the source. The compilation module provides the determined one or more characteristics of the source to the client. A presentation module of the client presents the one or more characteristics of the source to a user.

In one embodiment of the invention, a local logic module executing on a client determines the characteristics of the source based on information stored in a cache module of the client. In another embodiment of the invention, an analysis module of the server determines a weighted score based on the characteristics of the source and provides the weighted score to the client such that the presentation module can present the weighted score to the user.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
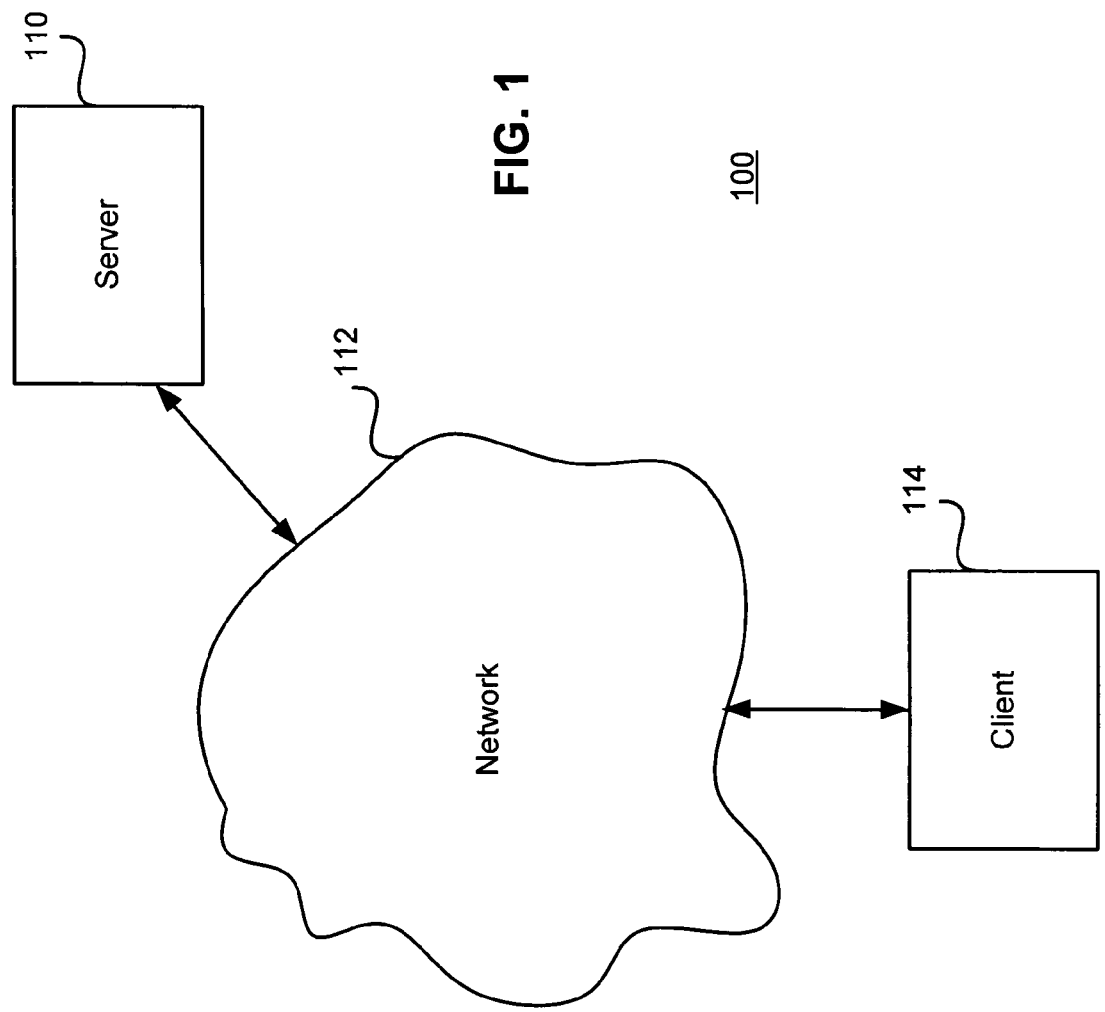
FIG. 1 is a high-level block diagram of a computing environment according to an embodiment of the present invention.

FIG. 1 is a high-level block diagram of a computing environment 100 according to an embodiment of the present invention. FIG. 1 illustrates a server 110 connected to a network 112. The network 112 is also connected to a client 114. However, in an alternative embodiment, the invention can be implemented within a single machine (e.g., in the client 114) without interaction with the server 110.

The network 112 provides communications between and among the other entities illustrated in the computing environment 100 of FIG. 1. In one embodiment, the network 112 is the Internet and uses wired and/or wireless links. The network 112 may include a cellular telephone network or other data network having a peering point with the Internet. The network 112 can also utilize dedicated or private communications links that are not necessarily part of the Internet. The entities illustrated in FIG. 1 use conventional communications technologies such as the transmission control protocol/Internet protocol (TCP/IP) to communicate over the network. The entities of FIG. 1 also use conventional communications protocols such as the hypertext transfer protocol (HTTP), the simple mail transfer protocol (SMTP), the file transfer protocol (FTP), etc. The entities can also engage in secure communications using technologies including the secure sockets layer (SSL), Secure HTTP and/or virtual private networks (VPNs). The communicated messages utilize conventional data encodings such as hypertext markup language (HTML), extensible markup language (XML), etc. In one embodiment, the network 112 includes non-electronic links. For example, the server 110 may communicate with the client 114 via U.S. mail, etc.

The server 110 can include one or more standard computer systems configured to communicate with the client 114 via the network 112. For example, the server 110 can include a web server, FTP server, or other technology that enables the server 110 to interact with, and provide content to, the client 114 via the network 112.

In one embodiment, the client 114 is a conventional computer system executing, for example, a Microsoft Windows-compatible operating system (OS), Apple OS X, and/or a Linux-compatible OS. In another embodiment, the client 114 is another device having computer functionality, such as a personal digital assistant (PDA), cellular telephone, video game system, etc. Although one client 114 is shown in FIG. 1, embodiments of the present invention can have thousands or millions of such clients.

Figure 2:
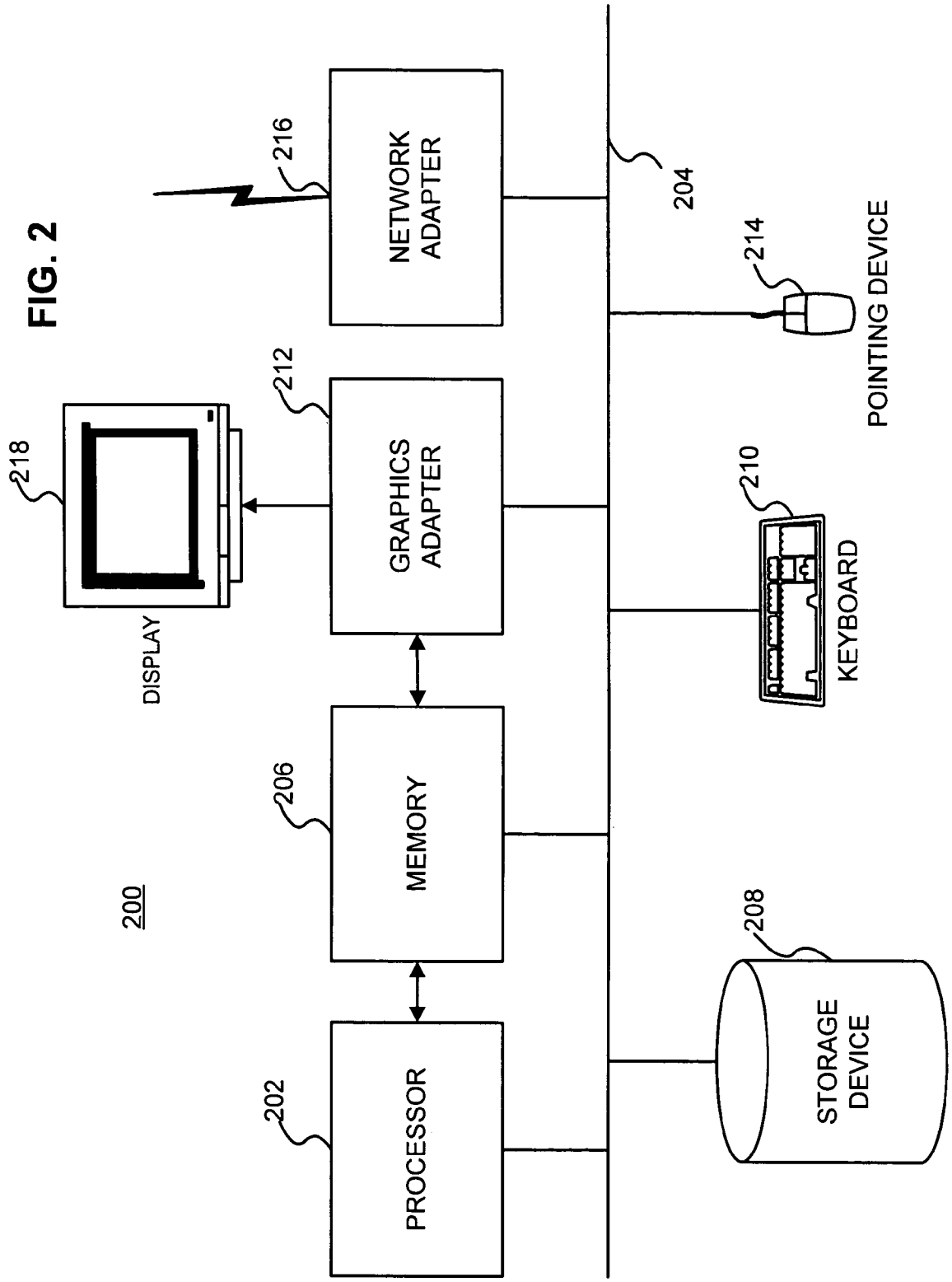
FIG. 2 is a high-level block diagram illustrating a functional view of a typical computer system acting as a client according to an embodiment of the present invention.

FIG. 2 is a high-level block diagram illustrating a functional view of a typical computer system 200 acting as a client 114 according to an embodiment of the present invention. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The storage device 208 stores multiple computer files. The pointing device 214 may be a mouse, track ball, or other type of pointing device, and is used in combination with the keyboard 210 to input data into the computer system 200. The graphics adapter 212 displays images and other information on the display 218. The network adapter 216 couples the client 114 with the network 112.

As is known in the art, the computer system 200 is adapted to execute computer program modules for providing functionality described herein. In this description, the term "module" refers to computer program logic for providing the specified functionality. A module can be implemented in hardware, firmware, and/or software. It will be understood that the modules described herein represent one embodiment of the present invention. Certain embodiments may include other modules. In addition, the embodiments may lack modules described herein and/or distribute the described functionality among the modules in a different manner. In one embodiment, the modules are stored on the storage device 208, loaded into the memory 206, and executed by the processor 202.

Figure 3:
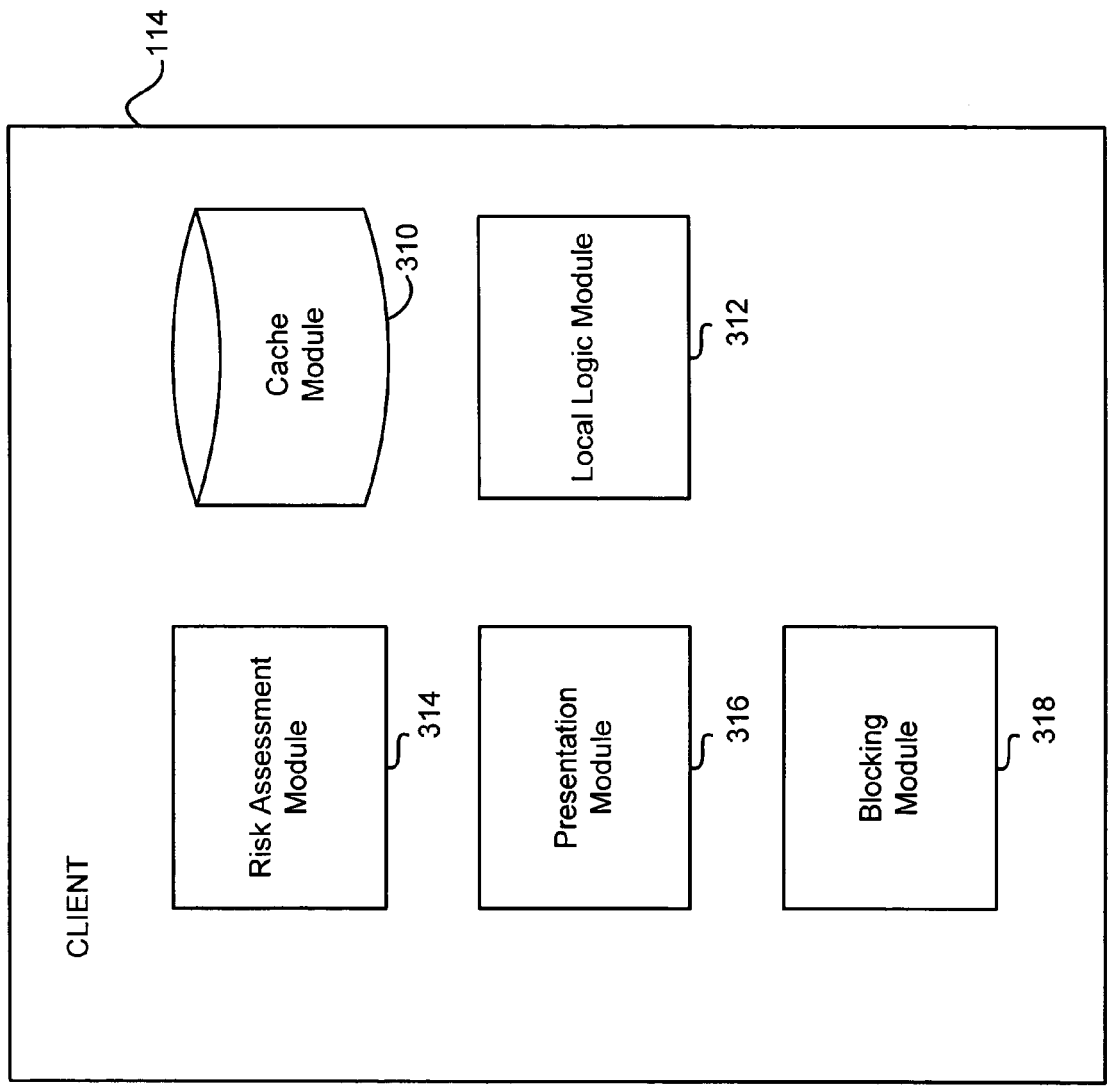
FIG. 3 is a high-level block diagram illustrating modules within a client according to an embodiment of the present invention.

FIG. 3 is a high-level block diagram illustrating modules within the client 114 according to an embodiment of the present invention. Those of skill in the art will understand that other embodiments of the client 114 can have different and/or other modules than the ones described herein. In addition, the functionalities can be distributed among the modules in a manner different than described herein.

FIG. 3 illustrates a cache module 310, a local logic module 312, a risk assessment module 314, a presentation module 316, and a blocking module 318. According to an embodiment of the invention, the client 114 receives a communication from an external source (e.g., a network source such as a web site) via the network adapter 216. The communication from the external source can be an email, an instant message, a web page, or any other types of communication capable of being received and processed by the client 114. Alternatively, the source may be located within the client 114. For example, the source may be executable code or data that was previously downloaded to or stored in the client 114.

If the source is located within the client 114 (i.e., a local source), the local logic module 312 identifies one or more characteristics of the local source. Specifically, the local logic module 312 determines characteristics such as how long the local source been stored in the client 114, whether the client 114 previously interacted with the local source without a harmful result, whether the local source corrupted or infected with a virus, worm, or other malicious program, the local source's origin (e.g., from a disk or over a network via a browser, email, or file sharing, etc.). Thus, the local logic module 312 can determine the local source's riskiness and trustworthiness based on, for example, where the local source came from, how long the local source been stored, and how many times the local source been used. The local logic module 312 can obtain such characteristics from the storage device 208 and/or the cache module 310. The local logic module 312 communicates the identified one or more characteristics of the local source to the presentation module 316.

If the client 114 receives a communication from an external source, the local logic module 312 identifies one or more characteristics of the external source based on information stored in the cache module 310 (e.g., a local memory area). The information stored in the cache module 310 can be received from the server 110 and/or generated from client behavior. According to an embodiment of the invention, the cache module 310 stores information about various external sources. For example, if a user has previously visited a web site via the client 114, information about the visit is stored in the cache module 310. Thus, the cache module 310 may store information including how frequently the user visited a particular web site and the date and time of a visit. Accordingly, the local logic module 312 can decide that since the client 114 frequently visits the web site without any harmful result, communications from that web site are harmless. Additionally, the cache module 310 can store an external source's known characteristics (e.g., that a particular web site has engaged in a phishing scam). The cache module 310 can obtain the external source's known characteristics, for example, from user input or by downloading such information from the server 110 or another resource. The local logic module 312 communicates the locally identified one or more characteristics of the external source to the presentation module 316.

In addition to or in lieu of the local logic module 312 identifying the external source's characteristics based on information stored in the cache module 310, the risk assessment module 314 obtains information regarding the external source from the received communication. If the communication includes links to one or more other external sources (e.g., a received email may include a link to a web site), the risk assessment module 314 compiles these links and obtains information regarding the other external sources corresponding to these links. The information regarding a source that the risk assessment module 314 may obtain includes IP address (e.g., an email server can record the IP address from which an email was received in the form of a header), uniform resource locator (URL), domain name, etc. The risk assessment module 314 communicates the obtained information regarding an external source to the server 110 and stores the obtained information in the cache module 310.

The server 110 uses one or more services to identify and compile one or more characteristics of the external source. The server 110 communicates the identified one or more characteristics of the external source to, for example, the presentation module 316 of the client 114. The cache module 310 also stores the identified one or more characteristics of the external source for future use by the local logic module 312.

The presentation module 316 includes logic that determines how to present an identified characteristic of a source (whether local or external) to the user of the client 114.

Specifically, the presentation module 316 provides the source's characteristics such that the user can make an informed decision as to whether the source is a threat. Based on this informed decision, the user can further decide what action to perform with regard to a communication from that source (e.g., launching an antivirus program, opening a link, submitting a web form, responding to an email with sensitive information, or allowing executable code to be downloaded and executed).

There are several ways for the presentation module 316 to present a source's characteristic. In one way, the presentation module 316 can provide visual and/or audible cues as part of the communication that is rendered to the user (e.g., highlighting a text or changing a background color of a web page or email). Specifically, the presentation module 316 can connect to, for example, a web browser, a file system browser, an instant messaging program, or an email program of the client 114, to modify the rendered communication in a way to alert the user that the communication or the source of the communication may be fraudulent or harmful. Thus, the presentation module 316 can change the color, font, or size of a link or content to alert the user.

In another way, the presentation module 316 can provide visual and/or audible warnings to the user independently of the rendered communication. For example, if the user moves a cursor of the pointing device 214 over to a link included in an email or web page, the presentation module 316 may provide a pop-up message on the display 218 warning that the source represented by the link is known to have engaged in a fraudulent act (e.g., wrongfully soliciting credit card information). Additionally, the presentation module 316 can place an icon or other types of indicator on the program rendering the communication to show the source's characteristic. Some of the indicators that provide characteristic information include a country indicator (e.g., a country flag icon) specifying the country in which the source is physically located, a dialup or cable indicator (e.g., a phone/cable modem icon) specifying that the source is using a dialup or cable modem to connect to the network 112, a rating indicator (e.g., a color, numeric scale, or thermometer-type display) specifying the reputation of the source, a blue chip indicator that identifies the source as a well-established entity or as being hosted on a web-hosting farm, and a known-compromised indicator specifying that the source is known to have been compromised by a fraudulent party or known to have engaged in a fraudulent act. These indicators can appear on a modified title bar, status bar, global task bar, or tray area of the program. Furthermore, the indicators can appear on a special window on the display 218 and can include images, sounds, and animations.

To illustrate, the user may open a file system browser and navigate to a folder containing an executable (i.e., a local source). If the local logic module 312 had determined that the executable is not trustworthy (e.g., it was recently downloaded to the client 114 by an untrustworthy executable or via an unreliable channel such as an email or the Internet), the presentation module 316 may place an icon or some other types of indicator in the file system browser's directory listing to warn the user that the executable is not trustworthy. Alternatively, the presentation module 316 may present a warning dialog on the display 218 when the user attempts to run the executable. On the other hand, if the local logic module 312 had determined that the executable is trustworthy (e.g., it was installed from a CD and/or was digitally signed by a reputable provider), the presentation module 316 may indicate to the user that the executable is relatively trustworthy.

According to an embodiment of the invention, the risk assessment module 314 and/or the local logic module 312 also communicate a given source's characteristic to the blocking module 318 such that the blocking module 318 can determine whether to block a communication from that source. Accordingly, the blocking module 318 has more information to assess the harmfulness of a communication and can reduce false-positive threat detections. In addition, the presentation module 316 and the blocking module 318 coordinate to reduce the threats faced by the user. Thus, if the risk assessment module 314 and/or the local logic module 312 are certain that a particular communication is a threat to the user (e.g., the identified one or more characteristics of the source or the communicated content exceeds a threshold of riskiness), the blocking module 318 automatically prevents the communication from being presented to the user. But if the risk assessment module 314 and/or the local logic module 312 are not certain that the communication is a threat to the user, the presentation module 316 presents the identified one or more characteristics of the source to the user. The user can thus make an informed decision as to whether the communication is a threat. The presented source characteristics thus provide an added layer of security to the user, who can himself or herself decide the riskiness of a communication, notwithstanding that the blocking module 318 or other security modules may attempt to reduce false positive detections.

In an alternative embodiment of the invention, regardless of whether the blocking module 318 blocks a communication, the presentation module 316 will present the identified one or more characteristics of the source to the user.

Figure 4:
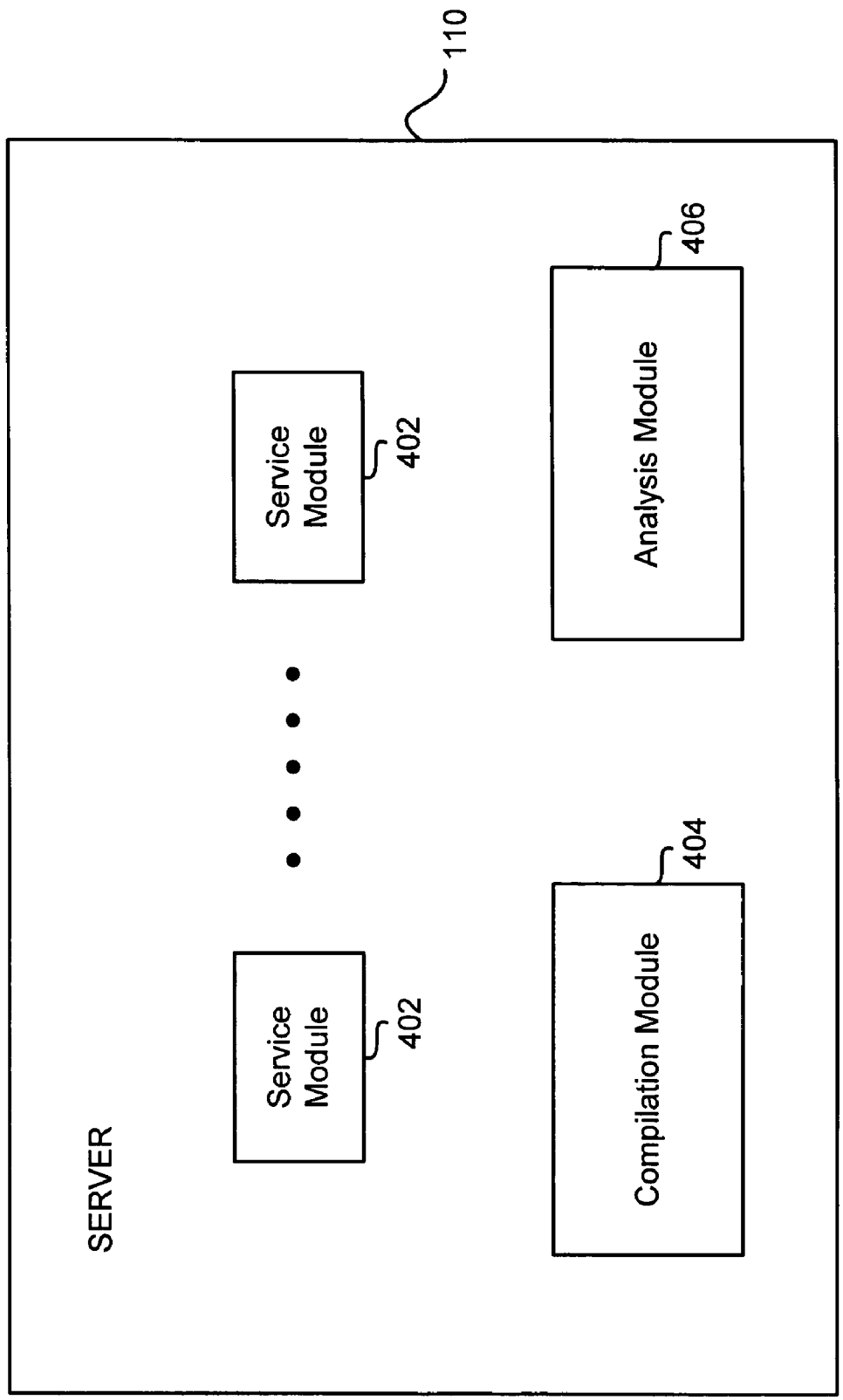
FIG. 4 is a high-level block diagram illustrating modules and services within a server according to an embodiment of the present invention.

FIG. 4 is a high-level block diagram illustrating modules within the server 110 according to an embodiment of the present invention. Those of skill in the art will understand that other embodiments of the server 110 can have different and/or other modules than the ones described herein. In addition, the functionalities can be distributed among the modules in a manner different than described herein.

FIG. 4 illustrates one or more service modules 402, a compilation module 404, and an analysis module 406. According to an embodiment of the invention, the compilation module 404 receives information regarding an external source (e.g., IP address, domain name, and/or URL of the external source) from the client 114 and accesses the service modules 402 to identify one or more characteristics of the external source. The service modules 402 may be located within the server 110. Alternatively, one or more of the service modules 402 may be located within one or more other servers from which the compilation module 404 accesses to obtain the characteristic information.

The service modules 402 provide various resources and services that assist the compilation module 404 in identifying a source's characteristics. In one embodiment of the invention, the service modules 402 include a geolocation database. The geolocation database provides an estimation of a given IP address's physical location, which can be one of the source's characteristics that the server 110 provides to the client 114. The service modules 402 can also provide or access a real-time black hole list (RBL). The compilation module 404 uses the RBL to classify a source (e.g., an email server) as a known spam originator or as an open relay (which can be co-opted by spammers). The compilation module 404 can also use the RBL to classify a given IP address as being on a dial-up modem, cable modem or similar medium indicating that the IP address is not maintained by a well-established entity using a more expensive network connection (e.g., a T-1 line).

The services 420 can also include a domain name service (DNS), whois, or trace routing database. The compilation module 404 uses such a database to determine that a given source's IP address is hosted on a free web-hosting farm. Many fraudulent parties use such farms to host their web sites and to perpetrate phishing or other scams. On the other hand, well-established entities usually do not host their web sites on such web-hosting farms.

The services 420 can further include a web rating service that compiles statistics on a web site's web traffic. The compilation module 404 uses this information to determine if a user can safely rely on a source's content; that is, a source's rating indicates whether the source can be relied on to not perpetrate a fraudulent act. Moreover, the compilation module 404 can use the DNS, whois, or trace routing database to track an IP address's owner. The compilation module 404 can cross-reference the indicated owner with information about public entities to generate a rating that indicates the owner's trustworthiness.

Some other service modules 402 include a service that provides an external source's age (the longer that a source is in existence, the more likely that it is reliable), a service that uses a web crawler to detect web sites that appear to duplicate contents of other legitimate web sites, and a service that provides a list of sources that are known to have compromised security and/or a list of legitimate sources that are known to have been compromised by fraudulent parties. The compilation module 404 utilizes these service modules 402 to identify and gather one or more characteristics regarding a source submitted by the client 114. The compilation module 404 communicates the identified one or more characteristics of the source to the client 114.

In an embodiment of the invention, the compilation module 404 provides the identified one or more characteristics of a source to the analysis module 406 of the server 110. The analysis module 406 weighs each of the characteristics and determines a score representing a threat assessment for the source. For example, if a source is from a dialup modem, is not physically located in the United States, and is an unknown provider, the analysis module 406 may determine a high-risk score for that source. The determined score for a given source can also be considered a characteristic for that source. Accordingly, the analysis module 406 communicates the source's score to the presentation module 316 of the client 114 for presenting to the user and storage in the cache module 310. One with ordinary skill in the art will readily recognize that there are many functions suitable for weighing different characteristics and assigning a score based on the weighted characteristics.

Figure 5:
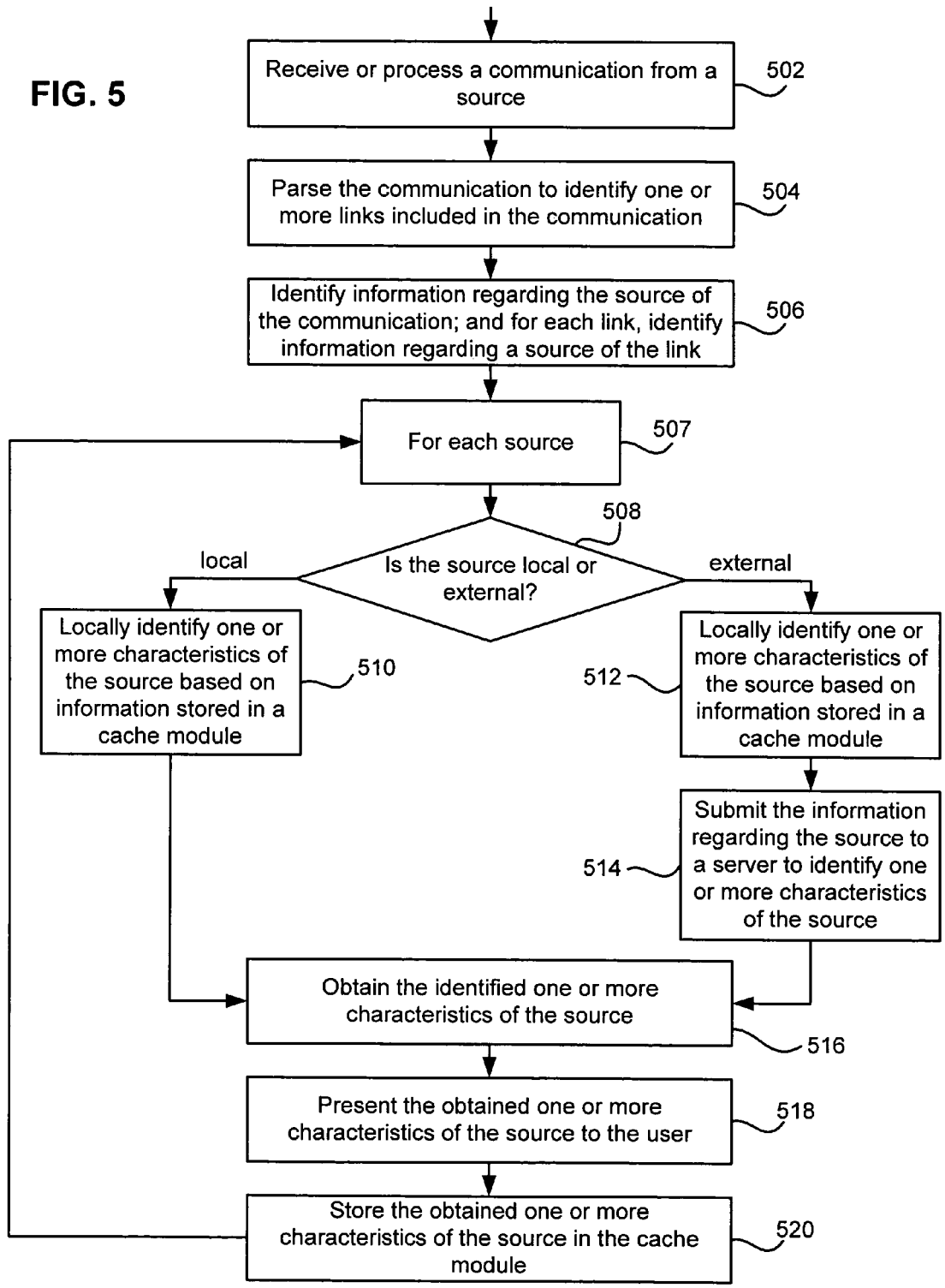
FIG. 5 is a flowchart illustrating steps performed by a client according to an embodiment of the present invention.

FIG. 5 is a flowchart illustrating steps performed by the client 114 according to an embodiment of the invention. The figure omits some possible steps. In addition, some embodiments perform different steps in addition to, or instead of, the ones described herein. Furthermore, the order of the steps can vary from that described herein.

The client 114 receives or processes 502 a communication from a source. The risk assessment module 314 parses 504 the communication to identify one or more links included in the communication. The risk assessment module 314 also identifies 506 information (e.g., IP address, domain name, and URL) regarding the communication's source. Further, for each link included in the communication, the risk assessment module 314 identifies information regarding the link's source.

For each source (of the communication or of a link) at 507, the risk assessment module 314 determines 508 if the source is local or external. If the source is local (i.e., within the client 114), the local logic module 312 locally identifies 510 one or more characteristics of the source based on available information stored in the cache module 310. If the source is external (e.g., a network source external to the client 114), the local logic module 312 also locally identifies 512 one or more characteristics of the source based on available information stored in the cache module 310. The risk assessment module 314 further submits 514 the information regarding the source to a server, if necessary. The server identifies one or more characteristics of the source based on one or more services external to the client 114.

The presentation module 316 obtains 516 the identified one or more characteristics of the source and presents 518 the obtained one or more characteristics of the source to the user. In addition, the client 114 stores 520 the obtained one or more characteristics of the source in the cache module 310 for future use by the local logic module 312. The client 114 returns to step 507 to process the next source.

Figure 6:
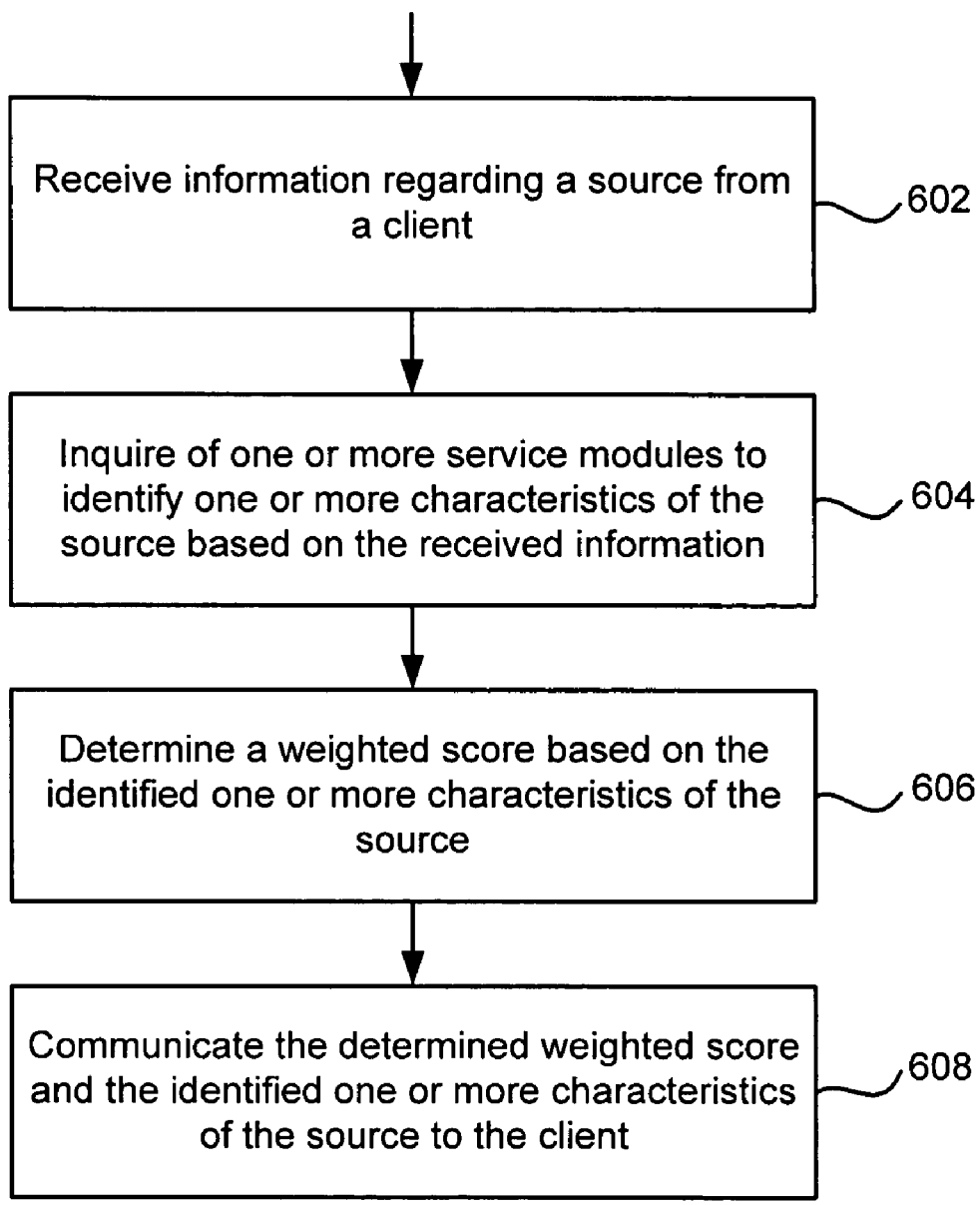
FIG. 6 is a flowchart illustrating steps performed by a server according to an embodiment of the present invention.

FIG. 6 is a flowchart illustrating steps performed by the server 110 according to an embodiment of the invention. The figure omits some possible steps. In addition, some embodiments perform different steps in addition to, or instead of, the ones described herein. Furthermore, the order of the steps can vary from that described herein.

The server 110 receives 602 information regarding a source from the client 114. The compilation module 404 inquires 604 of one or more service modules 402 (whether external or internal to the server 110) to identify one or more characteristics of the source based on the received information. The analysis module 406 determines 606 a weighted score based on the identified one or more characteristics of the source. The server 110 communicates 608 the determined weighted score and the identified one or more characteristics of the source to the client 114.

The above description is included to illustrate the operation of the preferred embodiments and is not meant to limit the scope of the invention. Where the description refers to "one" embodiment and/or "another" embodiment, it will be understood that the description is not necessarily referring to different embodiments. The scope of the invention is to be limited only by the following claims. From the above discussion, many variations will be apparent to one skilled in the relevant art that would yet be encompassed by the spirit and scope of the invention.

We claim:

1. A method of informing a user of a computer system of a potential threat, comprising:

using the computer system to perform steps comprising:
identifying information regarding a source of a communication;
determining a characteristic of the source based on the identified information regarding the source, wherein the determined characteristic comprises a reputation of the source and whether the source is a well-established entity;
determining a score representing a threat assessment for the source responsive to the determined characteristic; and
graphically presenting a representation of the score representing the threat assessment for the source to the user in association with the communication, wherein the representation comprises an icon indicating the reputation of the source and whether the source is a well-established entity, and wherein the icon is graphically presented in association with a program executing on the computer system and rendering the communication.

2. The method of claim 1, further comprising:
parsing the communication from the source to identify a link included in the communication;
identifying information regarding the link's source;
determining a characteristic of the link's source based on the identified information regarding the link's source; and
graphically presenting a representation of the determined characteristic of the link's source to the user in association with the communication.

3. The method of claim 1, wherein the source is executable code stored locally in the computer system.

4. The method of claim 1, wherein determining the characteristic of the source comprises:
communicating the identified information regarding the source to a server; and
receiving the characteristic of the source from the server.

5. The method of claim 1, wherein determining the characteristic of the source comprises:
determining the characteristic of the source based on information stored in a local memory area.

6. The method of claim 1, further comprising:
storing the determined characteristic of the source in a local memory area.

7. The method of claim 1, further comprising:
presenting the determined characteristic of the source to the user via an audible cue.

8. The method of claim 1, wherein the determined characteristic comprises a risk that the source is malicious.

9. The method of claim 1, further comprising:
determining a plurality of characteristics of the source based on the identified information regarding the source,
wherein the graphically presenting presents a representation of the plurality of determined characteristics of the source in association with the communication.

10. The method of claim 9, wherein the icon indicates the plurality of determined characteristics of the source.

11. The method of claim 9, further comprising:
determining a score representing a threat assessment for the source responsive to the plurality of determined characteristics.

12. The method of claim 1, wherein the determined characteristic comprises whether the source is using a dialup or cable modem and the icon indicates whether the source is using a dialup or cable modem.

13. The method of claim 1, wherein the determined characteristic comprises a country where the source is physically located and the icon indicates the country.

14. The method of claim 1, wherein the determined characteristic comprises whether the source is known to have been compromised by a fraudulent party and the icon indicates whether the source has been compromised.

15. The method of claim 1, wherein the graphically presenting further comprises:
modifying a rendering of the communication to graphically indicate the determined characteristic of the source.

16. A system for informing a user of a computer system of a potential threat, comprising:
a computer-readable storage medium storing executable program code, the program code comprising:
a risk assessment module for identifying information regarding a source of a communication;
a local logic module for determining a characteristic of the source based on the identified information regarding the source and determining a score representing a threat assessment for the source responsive to the determined characteristic, wherein the determined characteristic comprises a reputation of the source and whether the source is a well-established entity; and
a presentation module for graphically presenting a representation of the score representing the threat assessment for the source to the user in association with the communication, wherein the representation comprises an icon indicating the reputation of the source and whether the source is a well-established entity, and wherein the icon is graphically presented in association with a program executing on the computer system and rendering the communication.

17. The system of claim 16,
wherein the risk assessment module is adapted to parse the communication from the source to identify a link included in the communication and to identify information regarding the link's source;
wherein the local logic module is adapted to determine a characteristic of the link's source based on the identified information regarding the link's source; and
wherein the presentation module is adapted to graphically present a representation of the determined characteristic of the link's source to the user in association with the communication.

18. The system of claim 16, wherein the source is executable code stored locally in the computer system.

19. The system of claim 16, wherein the risk assessment module is adapted to:
communicate the identified information regarding the source to a server; and
receive the characteristic of the source from the server.

20. The system of claim 16, further comprising:
a cache module for storing characteristic information of one or more sources; and
wherein the local logic module is adapted to determine the characteristic of the source based on the characteristic information stored in the cache module.

21. The system of claim 16, wherein the presentation module is adapted to:
present the determined characteristic of the source to the user via an audible cue.

22. The system of claim 16, wherein the determined characteristic comprises a risk that the source is malicious.

23. A computer program product having a computer-readable medium having embodied thereon program code for informing a user of a computer system of a potential threat, the program code comprising:
a risk assessment module for identifying information regarding a source of a communication;
a local logic module for determining a characteristic of the source based on the identified information regarding the source and determining a score representing a threat assessment for the source responsive to the determined characteristic, wherein the determined characteristic comprises a reputation of the source and whether the source is a well-established entity; and
a presentation module for graphically presenting a representation of the score representing the threat assessment for the source to the user in association with the communication, wherein the representation comprises an icon indicating the reputation of the source and whether the source is a well-established entity, and wherein the icon is graphically presented in association with a program executing on the computer system and rendering the communication.

24. The computer program product of claim 23,
wherein the risk assessment module is adapted to parse the communication from the source to identify a link included in the communication and to identify information regarding the link's source;
wherein the local logic module is adapted to determine a characteristic of the link's source based on the identified information regarding the link's source; and
wherein the presentation module is adapted to graphically present a representation of the determined characteristic of the link's source to the user in association with the communication.

25. The computer program product of claim 23, wherein the source is executable code stored locally in the computer system.

26. The computer program product of claim 23, wherein the risk assessment module is adapted to:
communicate the identified information regarding the source to a server; and
receive the characteristic of the source from the server.

27. The computer program product of claim 23, wherein the program code further comprises:
a cache module for storing characteristic information of one or more sources; and
wherein the local logic module is adapted to determine the characteristic of the source based on the characteristic information stored in the cache module.

28. The computer program product of claim 23, wherein the determined characteristic comprises a risk that the source is malicious.

\* \* \* \* \*